US009465485B2

(12) United States Patent
Yang (10) Patent No.: US 9,465,485 B2
(45) Date of Patent: Oct. 11, 2016

(54) PIXEL DRIVING CIRCUIT HAVING A PHOTOSENSITIVE SUB-CIRCUIT AND DRIVING METHOD THEREFOR, AND ARRAY SUBSTRATE (71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 14/437,021

(22) PCT Filed: Sep. 2, 2014

(86) PCT No.: PCT/CN2014/085776
§ 371 (c)(1),
(2) Date: Apr. 20, 2015

(87) PCT Pub. No.: WO2015/169014
PCT Pub. Date: Nov. 12, 2015

(65) Prior Publication Data
US 2016/0103513 A1 Apr. 14, 2016

(30) Foreign Application Priority Data

May 6, 2014 (CN) .......................... 2014 1 0189757

(51) Int. Cl.
G06F 3/042 (2006.01)
G06F 3/041 (2006.01)
G09G 3/32 (2016.01)

(52) U.S. Cl.
CPC ............... G06F 3/042 (2013.01); G06F 3/041 (2013.01); G06F 3/0412 (2013.01);
(Continued)

(58) Field of Classification Search
CPC ................................................... G06F 3/0421

USPC ......................................................... 345/175
See application file for complete search history.

(56) References Cited

U.S. PATENT DOCUMENTS 9,122,339 B2   9/2015 Yang
2005/0099372 A1   5/2005 Nakamura et al.
(Continued)

FOREIGN PATENT DOCUMENTS

CN   101943974 A   1/2011
CN   103000134 A   3/2013
(Continued)

OTHER PUBLICATIONS

International Search Report of the International Searching Authority for PCT/CN2014/085776 mailed on Feb. 4, 2015 in Chinese.
(Continued)

Primary Examiner — Long D Pham
(74) Attorney, Agent, or Firm — Collard & Roe, P.C.

(57) ABSTRACT

A pixel driving circuit comprises: a data line (Data), a first scan line (Scan[1]), a second scan line (Scan[2]), an enable control line (EM), a power supply line (Vdd), a light emitting element (D), a display sub-circuit (1) and a photosensitive sub-circuit (2); wherein the display sub-circuit (1) is connected to the data line (Data), the first scan line (Scan[1]), the second scan line (Scan[2]), the enable control line (EM), the power supply line (Vdd) and the light emitting element (D), and is configured to drive the light emitting element (D) to emit light for display under the control of the first scan line (Scan[1]), the second scan line (Scan[2]), the enable control line (EM), the data line (Data) and the power supply line (Vdd); and the photosensitive sub-circuit (2) is connected to the data line (Data), the first scan line (Scan[1]), the second scan line (Scan[2]) and the enable control line (EM), and is configured to sense a touch action under the control of the first scan line (Scan[1]), the second scan line (Scan[2]), the enable control line (EM) and the data line (Scan[1]).

20 Claims, 4 Drawing Sheets (52) U.S. Cl.
CPC ............. *G06F 3/0416* (2013.01); *G09G 3/32* (2013.01); *G09G 3/3258* (2013.01); *G09G 3/3266* (2013.01); *G09G 3/3291* (2013.01)

(56) References Cited

U.S. PATENT DOCUMENTS

| | | | | |
|---|---|---|---|---|
| 2010/0097350 | A1* | 4/2010 | Choi | ........................ G06F 3/042 345/175 |
| 2011/0148855 | A1* | 6/2011 | Kim | ..................... G09G 3/3233 345/214 |
| 2011/0273397 | A1* | 11/2011 | Hanari | .................. G06F 3/0412 345/174 |
| 2011/0291708 | A1 | 12/2011 | Ozawa | |
| 2014/0009412 | A1 | 1/2014 | Ahn et al. | |
| 2014/0175992 | A1 | 6/2014 | Yang | |
| 2014/0306867 | A1* | 10/2014 | Qing | .................... G09G 3/3233 345/76 |

FOREIGN PATENT DOCUMENTS

| | | |
|---|---|---|
| CN | 103135846 A | 6/2013 |
| CN | 103208255 A | 7/2013 |
| CN | 103218972 A | 7/2013 |
| CN | 203084684 U | 7/2013 |
| CN | 103236238 A | 8/2013 |
| CN | 103971639 A | 8/2014 |
| CN | 203812536 U | 9/2014 |
| WO | 2013066017 A1 | 5/2013 |

OTHER PUBLICATIONS

Written Opinion of the International Searching Authority for PCT/CN2014/085776 mailed on Feb. 4, 2015 in Chinese with the English translation.

Chinese Office Action in Chinese Application No. 201410189757.X mailed Sep. 6, 2015 with English translation.

* cited by examiner

PIXEL DRIVING CIRCUIT HAVING A PHOTOSENSITIVE SUB-CIRCUIT AND DRIVING METHOD THEREFOR, AND ARRAY SUBSTRATE

CROSS REFERENCE TO RELATED APPLICATIONS

This application is the National Stage of PCT/CN2014/085776 filed on Sep. 2, 2014, which claims priority under 35 U.S.C. §119 of Chinese Application No. 201410189757.X filed on the 6th of May 2014, the disclosure of which is incorporated by reference.

TECHNICAL FIELD OF THE DISCLOSURE

The present disclosure relates to a field of display technology, and particularly to a pixel driving circuit and a driving method therefor, an array substrate and a display apparatus.

BACKGROUND

Active Matrix Organic Light Emitting Diode Display (AMOLED) is a hotspot in the current research field of flat panel display. Compared to a liquid crystal display, OLED has advantages such as low power consumption, low manufacturing cost, self luminescent, wide viewpoint, and fast response, etc. At present, in the display field of mobile phones, personal digital assistants (PDA), and digital camera, etc., OLED has began to replace the conventional LCD display. Design of pixel driving circuit is a core technology of the AMOLED display, and is thus of great significance in research.

At present, part of photosensitive in cell touch technology has been successfully used in the LCD display and mass production has been achieved in the industry successfully by top-level manufacturers. The photosensitive touch not only possesses the same touch sensitivity and functionality as the capacitive touch manner, but also has an outstanding advantage that the photosensitive touch is not limited by a size of a screen and thus plays an important role in a large size touch application. In addition, the photosensitive touch not only can be achieved by a direct finger touch, but also can be achieved by a direct touch via a laser pen remotely.

Therefore, an integration of the photosensitive in cell touch technology and AMOLED, i.e. the integration of the Touch manufacturing process and the AMOLED manufacturing process which represent two newest technologies, would play a leading role in the display field in future. Therefore, the high efficient integration of the AMOLED display technology and the photosensitive in cell touch is urgently expected.

SUMMARY

According to embodiments of the present disclosure, it can be achieved that the AMOLED display technology is integrated with in cell touch more efficiently.

According to one aspect of the present disclosure, it is provided a pixel driving circuit comprising: a data line, a first scan line, a second scan line, an enable control line, a power supply line, a light emitting element, a display sub-circuit and a photosensitive sub-circuit; wherein the display sub-circuit is connected to the data line, the first scan line, the second scan line, the enable control line, the power supply line and the light emitting element, and is configured to drive the light emitting element to emit light for display under the control of the first scan line, the second scan line, the enable control line, the data line and the power supply line; and the photosensitive sub-circuit is connected to the data line, the first scan line, the second scan line and the enable control line, and is configured to sense a touch action under the control of the first scan line, the second scan line, the enable control line and the data line.

Optionally, the photosensitive sub-circuit comprises: a signal detecting line, a first storage capacitor, a reset unit, a signal sensing unit and a signal reading unit; wherein the reset unit is connected to the enable control line and a first terminal of the first storage capacitor, and is configured to reset a level at the first terminal of the first storage capacitor under the control of the enable control line; the signal sensing unit is connected to the data line, the first scan line and the first storage capacitor, and is configured to write a signal on the data line and a sensed photosensitive signal into the first storage capacitor under the control of the first scan line; the signal reading unit is connected to a second terminal of the first storage capacitor, the second scan line and the signal detecting line, and is configured to read out a signal stored in the first storage capacitor and transmit the same to the signal detecting line under the control of the second scan line.

Optionally, the reset unit comprises a seventh transistor having a gate connected to the enable control line, a source connected to a first terminal of the first storage capacitor and a drain connected to ground, and being configured to connect the first terminal of the first storage capacitor to ground under the control of the enable control line.

Optionally, the signal sensing unit comprises an eighth transistor and a photosensitive transistor, wherein the eighth transistor has a gate connected to the first scan line, a source connected to the data line and a drain connected to a source of the photosensitive transistor and the first terminal of the first storage capacitor, and is configured to write the signal on the data line into the first terminal of the first storage capacitor under the control of the first scan line; the photosensitive transistor has a gate connected to a source thereof and a drain connected to the second terminal of the first storage capacitor, and is configured to sense the photosensitive signal and write the same into the second terminal of the first storage capacitor.

Optionally, the signal reading unit comprises a ninth transistor having a gate connected to the second scan line, a source connected to the second terminal of the first storage capacitor, and a drain connected to the signal detecting line, and being configured to read out the signal stored in the first storage capacitor and transmit the same to the signal detecting line under the control of the second scan line.

Optionally, the display sub-circuit comprises a second storage capacitor, a restore unit, a data writing unit, a light emitting control unit, and a driving transistor. The restore unit is connected to the enable control line and a first terminal of the second storage capacitor, and is configured to restore a voltage at the first terminal of the second storage capacitor to a low level under the control of the enable control line. The data writing unit is connected to a second terminal of the second storage capacitor, the first scan line, the data line and the driving transistor, and is configured to write information comprising a threshold voltage of the driving transistor and the voltage on the data line into the second terminal of the second storage capacitor under the control of the first scan line. The light emitting control unit is connected to the second scan line, the data line, the power supply line, the first terminal of the second storage capacitor, the driving transistor and the light emitting element, wherein the driving transistor has a gate connected to the second terminal of the second storage capacitor and a source and a drain connected to the light emitting control unit, and the light emitting control unit is configured to make the first terminal of the second storage capacitor be at the voltage on the data line under the control of the second scan line and maintain the voltage difference across the two terminals of the second storage capacitor, and connect the driving transistor to the power supply line so as to drive the light emitting element to emit light.

Optionally, the restore unit comprises a first transistor having a gate connected to the enable control line, a source connected to the first terminal of the second storage capacitor and a drain connected to ground, and being configured to connect the first terminal of the second storage capacitor to ground under the control of the enable control line, and restore the first terminal of the second storage capacitor to the low level.

Optionally, the data writing unit comprises a second transistor and a third transistor, wherein the second transistor has a gate connected to the first scan line, a source connected to the data line and a drain connected to the source of the driving transistor; the third transistor has a gate connected to the first scan line, a source connected to the drain of the driving transistor, and a drain connected to the second terminal of the second storage capacitor; the second transistor and the third transistor are configured to form a path under the control of the first scan line so as to write information comprising the threshold voltage of the driving transistor and the voltage on the data line into the second terminal of the second storage capacitor.

Optionally, the light emitting control unit comprises: a fourth transistor, a fifth transistor and a sixth transistor, wherein the fourth transistor has a gate connected to the second scan line, a source connected to the power supply line, and a drain connected to the source of the driving transistor; the fifth transistor has a gate connected to the second scan line, a source connected to the drain of the driving transistor, and a drain connected to the light emitting element; the sixth transistor has a gate connected to the second scan line, a source connected to the data line, and a drain connected to the first terminal of the second storage capacitor, and is configured to write the voltage on the data line into the first terminal of the second storage capacitor under the control of the second scan line, and maintain the voltage difference across the two terminals of the second storage capacitor; the fourth transistor and the fifth transistor are configured to form a path under the control of the second scan line so as to connect the driving transistor to the power supply line to drive the light emitting element to emit light.

Optionally, the light emitting element is an organic light emitting diode having an anode connected to the light emitting control unit and a cathode connected to ground.

In the embodiments of the present disclosure, there is provided a driving method for any one of the pixel driving circuits described above, comprising: driving the light emitting element to emit light for display by the display sub-circuit under the control of the first scan line, the second scan line, the enable control line, data line, and the power supply line; and sensing a touch action by the photosensitive sub-circuit under the control of the first scan line, the second scan line, the enable control line and the data line.

Optionally, the photo sensitive sub-circuit comprises: a signal detecting line, a first storage capacitor, a reset unit, a signal sensing unit and a signal reading unit; wherein the step of sensing the touch action by the photosensitive sub-circuit under the control of the first scan line, the second scan line, the enable control line and the data line particularly comprises: applying an enable signal to the enable control line such that the reset unit resets a level at the first terminal of the first storage capacitor; applying a first scan valid signal to the first scan line, such that the signal sensing unit writes a signal on the data line and a sensed photosensitive signal into the first storage capacitor; and applying a second scan valid signal to the second scan line, such that the signal reading unit reads out a signal stored in the first storage capacitor and transmits the same to the signal detecting line.

Optionally, the signal sensing unit comprises an eighth transistor and a photosensitive transistor, wherein the eighth transistor has a gate connected to the first scan line, a source connected to the data line and a drain connected to a source of the photosensitive transistor and the first terminal of the first storage capacitor, and the step of applying the first scan valid signal to the first scan line such that the signal sensing unit writes the signal on the data line and the sensed photosensitive signal into the first storage capacitor particularly comprises: applying a first scan valid signal to the first scan line such that the eighth transistor is turned on to write the signal on the data line into the first terminal of the first storage capacitor, and such that the photosensitive transistor is turned on to sense the photosensitive signal and write the same into the second terminal of the first storage capacitor.

Optionally, the signal reading unit comprises a ninth transistor having a gate connected to the second scan line, a source connected to the second terminal of the first storage capacitor, and a drain connected to the signal detecting line; and the step of applying the second scan valid signal to the second scan line such that the signal reading unit reads out the signal stored in the first storage capacitor and transmits the same to the signal detecting line particularly comprises: applying the second scan valid signal to the second scan line such that the ninth transistor is turned on to read out the signal stored in the first storage capacitor and transmit the same to the signal detecting line.

Optionally, the display sub-circuit comprises a second storage capacitor, a restore unit, a data writing unit, a light emitting control unit, and a driving transistor, the step of driving the light emitting element to emit light for display by the display sub-circuit under the control of the first scan line, the second scan line, the enable control line, the data line and the power supply line particularly comprises: applying the enable signal to the enable control line such that the restore unit restores a voltage at the first terminal of the second storage capacitor to a low level; applying the first scan valid signal to the first scan line, such that the data writing unit writes information comprising the threshold voltage of the driving transistor and the voltage on the data line into the second terminal of the second storage capacitor; and applying the second scan valid signal to the second scan line, such that the light emitting control unit writes the voltage on the data line into the first terminal of the second storage capacitor and maintains the voltage difference across the two terminals of the second storage capacitor, and that the driving transistor is connected to the power supply line so as to drive the light emitting element to emit light.

Optionally, the data writing unit comprises a second transistor and a third transistor, wherein the second transistor has a gate connected to the first scan line, a source connected to the data line and a drain connected to the source of the driving transistor; the third transistor has a gate connected to the first scan line, a source connected to the drain of the driving transistor, and a drain connected to the second terminal of the second storage capacitor, and the step of applying the first scan valid signal to the first scan line such that the data writing unit writes information comprising the threshold voltage of the driving transistor and the voltage on the data line into the second terminal of the second storage capacitor particularly comprises: applying the first scan valid signal to the first scan line, such that the second transistor and the third transistor are turned on to form a path so as to write information comprising the threshold voltage of the driving transistor and the voltage on the data line into the second terminal of the second storage capacitor.

Optionally, the light emitting control unit comprises: a fourth transistor, a fifth transistor and a sixth transistor, wherein the fourth transistor has a gate connected to the second scan line, a source connected to the power supply line, and a drain connected to the source of the driving transistor; the fifth transistor has a gate connected to the second scan line, a source connected to the drain of the driving transistor, and a drain connected to the light emitting element; the sixth transistor has a gate connected to the second scan line, a source connected to the data line, and a drain connected to the first terminal of the second storage capacitor, and the step of applying the second scan valid signal to the second scan line such that the light emitting control unit writes the voltage on the data line into the first terminal of the second storage capacitor and maintains the voltage difference across the two terminals of the second storage capacitor, and that the driving transistor is connected to the power supply line so as to drive the light emitting element to emit light particularly comprises: applying the second scan valid signal to the second scan line, such that the sixth transistor is turned on so as to write the voltage on the data line into the first terminal of the second storage capacitor and maintain the voltage difference across the two terminals of the second storage capacitor, and that the fourth transistor and the fifth transistor are turned on to form a path so as to connect the driving transistor to the power supply line to drive the light emitting element to emit light.

In the embodiments of the present disclosure, there is further provided an array substrate comprising the above-described pixel driving circuit.

In the embodiments of the present disclosure, there is further provided a display device comprising the above array substrate.

The pixel driving circuit according to the embodiments of the present disclosure comprises a display sub-circuit and a photosensitive sub-circuit sharing signal lines (a first scan line, a second scan line, a data line and an enable control line), wherein both the display and the touch sensing are achieved.

DETAILED DESCRIPTION

Below, particular implementations of the present disclosure will be described in detail with reference to the accompanying drawings and the embodiments of the present disclosure. The following embodiments are only for illustrating the present disclosure, but not for limiting scope of the present disclosure.

Figure 1:
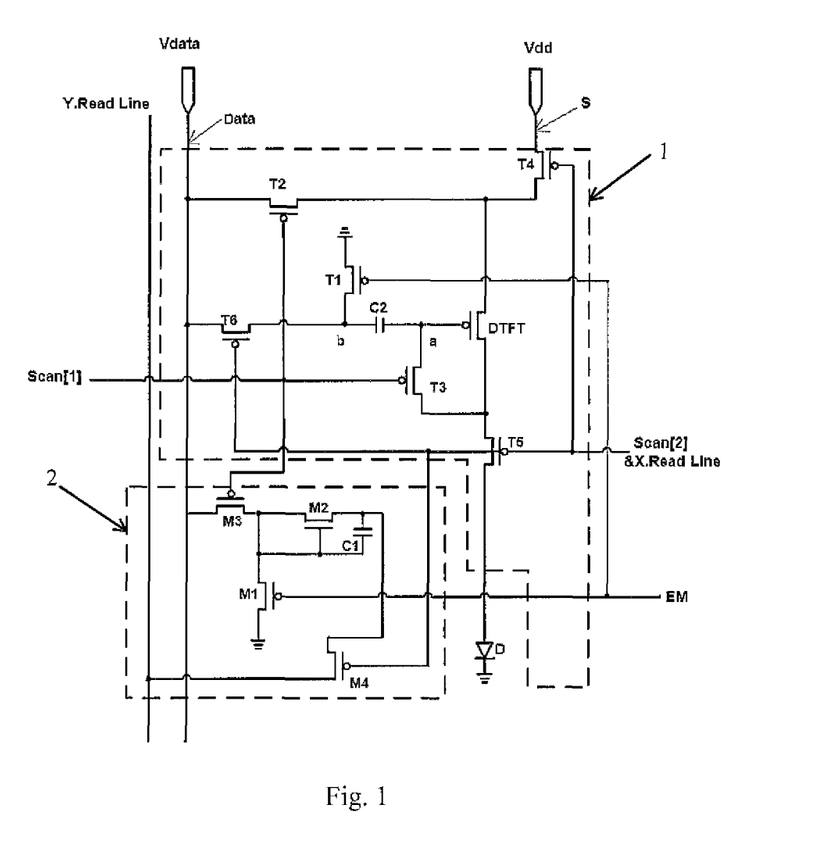
FIG. 1 is a schematic diagram illustrating a structure of a pixel driving circuit according to an embodiment of the present disclosure.

A pixel driving circuit according to the embodiments of the present disclosure comprises: a data line Data, a first scan line Scan[1], a second scan line Scan[2], an enable control line EM, a power supply line S, a light emitting element D, a display sub-circuit 1 and a photosensitive sub-circuit 2.

The display sub-circuit 1 is connected to the data line Data, the first scan line Scan[1], the second scan line Scan[2], the enable control line EM, the power supply line S and the light emitting element D, and is configured to drive the light emitting element D to emit light for display under the control of the first scan line Scan[1], the second scan line Scan[2], the enable control line EM, the data line Data and the power supply line S.

The photosensitive sub-circuit 2 is connected to the data line Data, the first scan line Scan[1], the second scan line Scan[2] and the enable control line EM, and is configured to sense a touch action under the control of the first scan line Scan[1], the second scan line Scan[2], the enable control line EM and the data line Data.

A particular configuration of the embodiments of the present disclosure is as illustrated in FIG. 1. The photosensitive sub-circuit 2 comprises: a signal detecting line Y. Read Line, a first storage capacitor C1, a reset unit, a signal sensing unit and a signal reading unit.

The reset unit is connected to the enable control line EM and a first terminal of the first storage capacitor C1, and is configured to reset a level at the first terminal of the first storage capacitor C1 under the control of the enable control line EM.

The signal sensing unit is connected to the data line Data, the first scan line Scan[1] and the first storage capacitor C1, and is configured to write a signal on the data line and a sensed photosensitive signal into the first storage capacitor C1 under the control of the first scan line Scan[1].

The signal reading unit is connected to a second terminal of the first storage capacitor C1, the second scan line Scan[2] and the signal detecting line Y. Read Line (i.e., vertical detecting line), and is configured to read out a signal stored in the first storage capacitor C1 and transmit the same to the signal detecting line Y. Read Line under the control of the second scan line Scan[2]. Here, the second scan line Scan[2] has a function of horizontal detecting line X. Read Line (a reference sign Scan[2]&X. Read Line means that the line represented thereby is not only the second scan line Scan[2] but also a horizontal detecting line X. Read Line), a position which is touched is finally determined by Y. Read Line and X. Read Line.

In the present embodiment, the reset unit comprises a seventh transistor M1 having a gate connected to the enable control line EM, a source connected to a first terminal of the first storage capacitor C1 and a drain connected to a ground. The seventh transistor M1 is configured to connect the first terminal of the first storage capacitor C1 to the ground under the control of the enable control line EM.

The signal sensing unit comprises an eighth transistor M3 and a photosensitive transistor M2. The eighth transistor M3 has a gate connected to the first scan line Scan[1], a source connected to the data line Data and a drain connected to a source of the photosensitive transistor M2 and the first terminal of the first storage capacitor C1, and is configured to write the signal on the data line into the first terminal of the first storage capacitor C1 under the control of the first scan line Scan[1]. The photosensitive transistor M2 has a gate connected to a source thereof and a drain connected to the second terminal of the first storage capacitor C1, and is configured to sense the photosensitive signal and write the same into the second terminal of the first storage capacitor C1.

The signal reading unit comprises a ninth transistor M4. The ninth transistor M4 has a gate connected to the second scan line Scan[2], a source connected to the second terminal of the first storage capacitor C1, and a drain connected to the signal detecting line Y. Read Line. The ninth transistor M4 is configured to read out the signal stored in the first storage capacitor C1 and transmit the same to the signal detecting line Y. Read Line under the control of the second scan line Scan[2]. As such, the touched position is finally determined by the signal detecting line Y. Read Line and the horizontal detecting line X. Read Line (i.e., the second scan line Scan[2]).

The pixel driving circuit according to the embodiments of the present disclosure comprises the display sub-circuit and the photosensitive sub-circuit, wherein the display sub-circuit and the photosensitive sub-circuit share signal lines (the first scan line, the second scan line, the data line and the enable control line), and display and touch sensing are achieved("touch" as mentioned in the present disclosure comprises touch by finger or touch by laser).

In the present embodiment, the display sub-circuit 1 comprises a second storage capacitor C2, a restore unit, a data writing unit, a light-emitting control unit, and a driving transistor.

The restore unit is connected to the enable control line EM and a first terminal (i.e. point b) of the second storage capacitor C2, and is configured to restore a voltage at the first terminal of the second storage capacitor C2 to a low level under the control of the enable control line EM.

The data writing unit is connected to a second terminal (i e point a) of the second storage capacitor C2, the first scan line Scan[1], the data line Data and the driving transistor DTFT, and is configured to write information comprising a threshold voltage $V_{th}$ of the driving transistor DTFT and the voltage $V_{data}$ on the data line Data into the second terminal of the second storage capacitor C2 under the control of the first scan line Scan[1]. At this time, a voltage at the point a is $V_{data}-V_{th}$.

The light emitting control unit is connected to the second scan line Scan[2], the data line Data, the power supply line S, the first terminal of the second storage capacitor C2, the driving transistor DTFT and the light emitting element D, wherein the driving transistor DTFT has a gate connected to the second terminal of the second storage capacitor C2 and a source and a drain connected to the light emitting control unit. The light emitting control unit is configured to make the first terminal of the second storage capacitor C2 at the voltage $V_{data}$ on the data line and maintain the voltage difference across the two terminals of the second storage capacitor C2, and connect the driving transistor DTFT to the power supply line S so as to drive the light emitting element D to emit light.

In the pixel driving circuit according to the present embodiment, the data writing unit writes the information about the threshold voltage of the driving transistor and the voltage on the data line into the second storage capacitor, and the threshold voltage of the driving transistor is compensated during the light-emitting procedure by the information about the threshold voltage of the driving transistor written into the second storage capacitor when the light emitting control unit controls the light-emitting device to emit light, such that the issue of non-homogeneous threshold voltages due to manufacturing process and long term operation of the driving transistors at pixels can be addressed, and that the current flowing through the light emitting element at each pixel is independent of the threshold voltage of the driving transistor at the pixel and the uniformity of image display is thus finally ensured.

In the present embodiment, the restore unit comprises a first transistor T1. The first transistor T1 has a gate connected to the enable control line EM, a source connected to the first terminal of the second storage capacitor C2 and a drain connected to ground. The first transistor Ti is configured to connect the first terminal of the second storage capacitor C2 to ground under the control of the enable control line EM, so as to restore the voltage at the first terminal of the second storage capacitor C2 to a low level. That is, when EM is at a valid signal, the first terminal of C2 is grounded through T1, and thus a voltage at the point b is 0.

In the present embodiment, the data writing unit comprises a second transistor T2 and a third transistor T3. The second transistor T2 has a gate connected to the first scan line Scan[1], a source connected to the data line Data and a drain connected to the source of the driving transistor DTFT. The third transistor T3 has a gate connected to the first scan line Scan[1], a source connected to the drain of the driving transistor DTFT, and a drain connected to the second terminal of the second storage capacitor C2. The second transistor T2 and the third transistor T3 are configured to form a path under the control of the first scan line Scan[1] so as to write information comprising the threshold voltage of the driving transistor DTFT and the voltage on the data line Data into the second terminal of the second storage capacitor C2.

Figure 2:
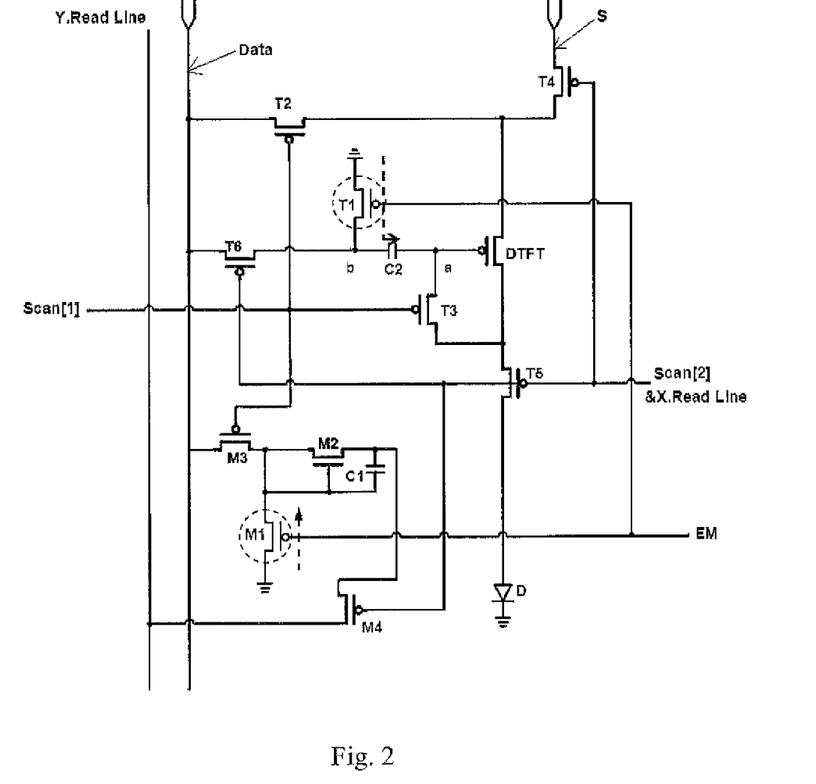
FIG. 2 is a schematic diagram illustrating an operation of the pixel driving circuit in FIG. 1 during a reset period.

Particularly, as illustrated in FIG. 2, the data writing unit comprises a second transistor T2 and a third transistor T3. The second transistor T2 has a gate connected to the first scan line Scan[1], a source connected to the data line Data and a drain connected to the source of the driving transistor DTFT. The third transistor T3 has a gate connected to the first scan line Scan[1], a source connected to the drain of the driving transistor DTFT, and a drain connected to the second terminal of the second storage capacitor C2. When the first scan line Scan[1] is at a valid level, T2 and T3 are turned on to form a path T2→DTFT→T3, the point a is charged by the signal $V_{data}$ through T2→DTFT→T3 until the point a is charged to $V_{data}-V_{th}$ (which satisfies the voltage difference $V_{th}$ between the gate and the source of the DTFT), at this time, the voltage across the two terminal of the second storage capacitor C2 is also $V_{data}-N_{th}$. In addition, since T5 is turned off, the current flowing in the path T2→DTFT→T3 will not flow through the light emitting element such that the loss of the light emitting element is reduced indirectly.

In the present embodiment, the light emitting control unit comprises: a fourth transistor T4, a fifth transistor T5 and a sixth transistor T6. The fourth transistor T4 has a gate connected to the second scan line Scan[2], a source connected to the power supply line S, and a drain connected to the source of the driving transistor DTFT. The fifth transistor T5 has a gate connected to the second scan line Scan[2], a source connected to the drain of the driving transistor DTFT, and a drain connected to the light emitting element D. The sixth transistor T6 has a gate connected to the second scan line Scan[2], a source connected to the data line Data, and a drain connected to the first terminal of the second storage capacitor C2. The sixth transistor T6 is configured to write the voltage on the data line Data into the first terminal of the second storage capacitor C2 under the control of the second scan line Scan[2] and maintain the voltage difference across the two terminals of the second storage capacitor C2. The fourth transistor T4 and the fifth transistor T5 are configured to form a path under the control of the second scan line Scan[2] so as to connect the driving transistor DTFT to the power supply line S to drive the light emitting element D to emit light.

Particularly, as illustrated in FIG. 2, the light emitting control unit comprises: a fourth transistor T4, a fifth transistor T5 and a sixth transistor T6. The fourth transistor T4 has a gate connected to the second scan line Scan[2], a source connected to the power supply line S, and a drain connected to the source of the driving transistor DTFT. The fifth transistor T5 has a gate connected to the second scan line Scan[2], a source connected to the drain of the driving transistor DTFT, and a drain connected to the light emitting element D. The sixth transistor T6 has a gate connected to the second scan line Scan[2], a source connected to the data line Data, and a drain connected to the first terminal of the second storage capacitor C2. When the second scan line Scan[2] is at a valid level, T4, T5 and T6 are turned on. At this time, the voltage at the point b changes from the previous 0V to $V_{data}$ and the point a is in a floating state, the voltage at the point a, i.e, at the gate of the DTFT will transit to $2V_{data}-V_{th}$ since the previous voltage difference $V_{data}-V_{th}$ between the points a and b should be maintained. At this time, T4, the driving transistor DTFT and T5 form a path T4→DTFT→T5 to connect the source of the driving transistor DTFT to the power supply line S which has a voltage $V_{dd}$, and a current flowing through T4→DTFT→T5 drives the light emitting element D to emit light.

From the equation for a saturation current of a driving transistor DTFT, it can be obtained that $$I_{OLED} = K(V_{GS}-V_{th})^2 = K\left[V_{dd}-(2V_{data}-V_{th})\right]^2 = K(V_{dd}-2V_{data})^2$$

$$K = \mu \cdot C_{ox} \frac{W}{L}$$

where $V_{GS}$ represents a gate-source voltage of the DTFT, u represents the carrier mobility, $C_{ox}$ represents the capacitance of the oxide layer of the gate, W/L represents the width/length ratio of the driving transistor DTFT.

From the above equation, it can be seen that the operational current $I_D$ is independent of $V_{th}$ and only has a relationship with $V_{data}$. Therefore, the issue of the threshold voltage drift due to manufacturing process and long term operation of the driving transistors DTFTs is thoroughly addressed, the effect of the threshold voltage ($V_{th}$) drift on the current for driving the light emitting element is also removed, and thus the normal operation of the light emitting element is ensured.

In the present embodiment, the light emitting element D can be an organic light emitting diode (OLED) having an anode connected to the light emitting control unit (particularly to the drain of the fifth transistor T5) and a cathode connected to ground.

The pixel driving circuit according to the present embodiment removes the effect of the threshold voltage $V_{th}$ drift of the driving transistor by voltage compensation, and meanwhile ensures that no current flows through the light emitting element (OLED) during a compensating and buffering period of the circuit so as to improve the lifespan of the OLED indirectly.

Mn the embodiments of the present disclosure, the AMOLED display technology is highly efficiently integrated with the photosensitive in cell touch, and the display sub-circuit is not limited to the display sub-circuit as described in the embodiments of the present disclosure but rather a display sub-circuit which can be controlled by the first scan line, the second scan line, the data line and the enable control line regardless of the number of TFTs, the number of capacitors, or the connection manner.

Furthermore, a driving method for the above-described pixel driving circuit is provided in the embodiments of the present disclosure, wherein the display sub-circuit 1 drives the light emitting element D to emit light for display under the control of the first scan line Scan[1], the second scan line Scan[2], the enable control line EM and the power supply line S; and the photosensitive sub-circuit 2 senses a touch action under the control of the first scan line Scan[1], the second scan line Scan[2], the enable control line EM and the data line Data.

Particularly, the photo sensitive sub-circuit 2 comprises: a signal detecting line Y. Read Line, a first storage capacitor C1, a reset unit, a signal sensing unit and a signal reading unit. The step in which the photosensitive sub-circuit 2 senses the touch action under the control of the first scan line Scan[1], the second scan line Scan[2], the enable control line EM and the data line Data particularly comprises: applying an enable signal to the enable control line EM such that the reset unit resets a level at the first terminal of the first storage capacitor C1; applying a first scan valid signal to the first scan line Scan[1], such that the signal sensing unit writes a signal on the data line and a sensed photosensitive signal into the first storage capacitor C1; and applying a second scan valid signal to the second scan line Scan[2], such that the signal reading unit reads out a signal stored in the first storage capacitor C1 and transmits the same to the signal detecting line Y Read Line.

Particularly, the signal sensing unit comprises an eighth transistor M3 and a photosensitive transistor M2. The eighth transistor M3 has a gate connected to the first scan line Scan[1], a source connected to the data line Data and a drain connected to a source of the photosensitive transistor M2 and the first terminal of the first storage capacitor C1.

The step of applying the first scan valid signal to the first scan line Scan[1] such that the signal sensing unit writes the signal on the data line and the sensed photosensitive signal into the first storage capacitor C1 particularly comprises: applying a first scan valid signal to the first scan line Scan[1], such that the eighth transistor M3 is turned on to write the signal on the data line into the first terminal of the first storage capacitor C1; and connecting the gate of the photosensitive transistor M2 to the drain of M3, such that M2 is turned on by the voltage on the data line to sense the photosensitive signal and write the same into the second terminal of the first storage capacitor C1.

Particularly, the signal reading unit comprises a ninth transistor M4 having a gate connected to the second scan line Scan[2], a source connected to the second terminal of the first storage capacitor C1, and a drain connected to the signal detecting line Y. Read Line.

The step of applying the second scan valid signal to the second scan line Scan[2] such that the signal reading unit reads out the signal stored in the first storage capacitor C1 and transmits the same to the signal detecting line Y. Read Line particularly comprises: applying the second scan valid signal to the second scan line Scan[2] such that the ninth transistor M4 is turned on to read out the signal stored in the first storage capacitor C1 and transmit the same to the signal detecting line Y. Read Line.

Particularly, the display sub-circuit 1 comprises a second storage capacitor C2, a restore unit, a data writing unit, and a light emitting control unit. The step in which the display sub-circuit 1 drives the light emitting element D to emit light for display under the control of the first scan line Scan[1], the second scan line Scan[2], the enable control line EM, the data line Data and the power supply line S particularly comprises: applying an enable signal to the enable control line EM such that the restore unit restores a voltage at the first terminal of the second storage capacitor C2 to a low level; applying a first scan valid signal to the first scan line Scan[1], such that the data writing unit writes information comprising a threshold voltage of the driving transistor DTFT and the voltage on the data line into the second terminal of the second storage capacitor C2; and applying a second scan valid signal to the second scan line Scan[2], such that the light emitting control unit writes the voltage on the data line into the first terminal of the second storage capacitor C2, maintains the voltage difference across the two terminals of the second storage capacitor C2, and connects the driving transistor DTFT to the power supply line S so as to drive the light emitting element D to emit light.

Particularly, the data writing unit comprises a second transistor T2 and a third transistor T3. The second transistor T2 has a gate connected to the first scan line Scan[1], a source connected to the data line Data and a drain connected to the source of the driving transistor DTFT. The third transistor T3 has a gate connected to the first scan line Scan[1], a source connected to the drain of the driving transistor DTFT, and a drain connected to the second terminal of the second storage capacitor C2.

The step of applying the first scan valid signal to the first scan line Scan[1] such that the data writing unit writes information comprising the threshold voltage of the driving transistor DTFT and the voltage on the data line Data into the second terminal of the second storage capacitor C2 particularly comprises: applying the first scan valid signal to the first scan line Scan[1], such that the second transistor T2 and the third transistor T3 are turned on to form a path so as to write information comprising the threshold voltage of the driving transistor DTFT and the voltage on the data line into the second terminal of the second storage capacitor C2.

Particularly, the light emitting control unit comprises: a fourth transistor 14, a fifth transistor T5 and a sixth transistor T6. The fourth transistor T4 has a gate connected to the second scan line Scan[2], a source connected to the power supply line S, and a drain connected to the source of the driving transistor DTFT. The fifth transistor T5 has a gate connected to the second scan line Scan[2], a source connected to the drain of the driving transistor DTFT, and a drain connected to the light emitting element D. The sixth transistor T6 has a gate connected to the second scan line Scan[2], a source connected to the data line Data, and a drain connected to the first terminal of the second storage capacitor C2.

The step of applying the second scan valid signal to the second scan line Scan[2] such that the light emitting control unit writes the voltage on the data line into the first terminal of the second storage capacitor C2, maintaining the voltage difference across the two terminals of the second storage capacitor C2, and connecting the driving transistor DTFT to the power supply line S so as to drive the light emitting element D to emit light particularly comprises: applying the second scan valid signal to the second scan line Scan[2], such that the sixth transistor T6 is turned on so as to write the voltage on the data line into the first terminal of the second storage capacitor C2, maintaining the voltage difference across the two terminals of the second storage capacitor C2, and turning on the fourth transistor T4 and the fifth transistor T5 to form a path so as to connect the driving transistor DTFT to the power supply line S to drive the light emitting element D to emit light.

Figure 3:
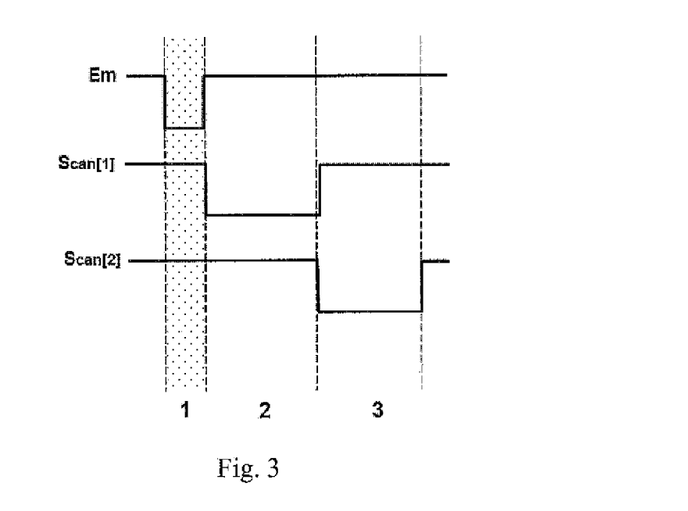
FIG. 3 is a schematic diagram illustrating a tuning sequence of the pixel driving circuit in FIG. 1 during the reset period, which corresponding to a first period.
Figure 4:
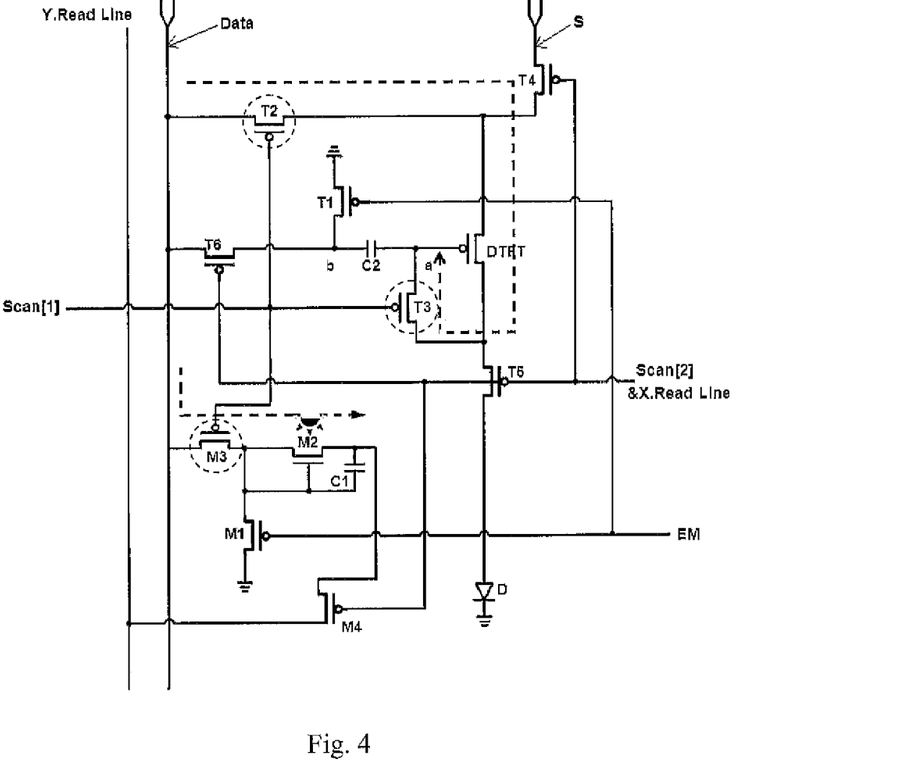
FIG. 4 is a schematic diagram illustrating an operation of the pixel driving circuit in FIG. 1 during a charging period.
Figure 5:
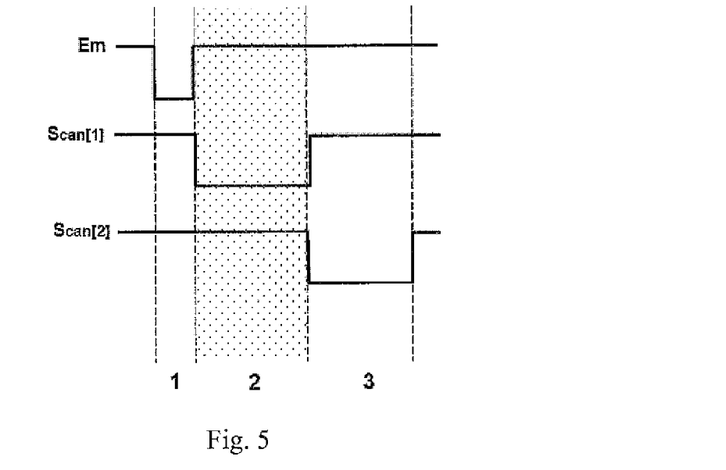
FIG. 5 is a schematic diagram illustrating a timing sequence of the pixel driving circuit in FIG. 1 during the charging period, which corresponding to a second period.
Figure 6:
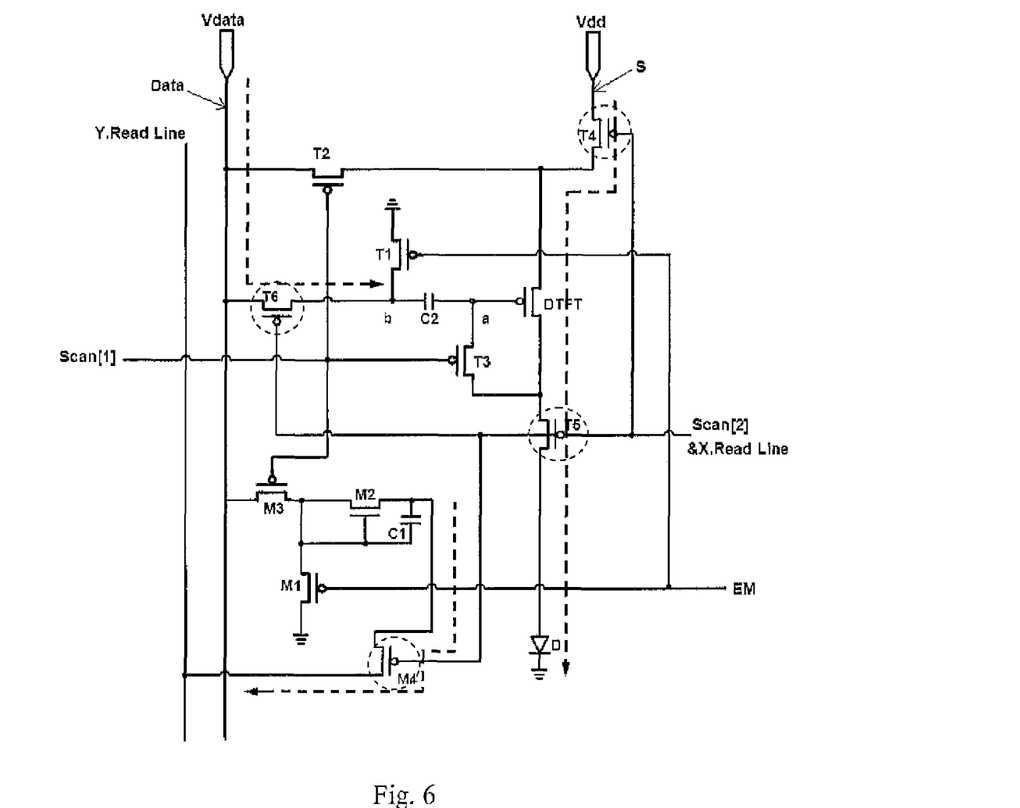
FIG. 6 is a schematic diagram illustrating an operation of the pixel driving circuit in FIG. 1 during a compensating period and a light-emitting period.

Below, particular explanation will be given to the driving process of the pixel driving circuit, that is, the driving circuit as illustrated in FIG. 1, in which except that the photosensitive transistor M2 is an N type transistor, others are P type transistors, particularly as illustrated in FIGS. 2-7, there are three periods. Here, in order for easy understanding, the operational principle of the photosensitive sub-circuit and the display sub-circuit are described separately although their operation is performed simultaneously during the actual operation. In FIG. 2, FIG. 4 and FIG. 6, TFT in a dashed outline is a TFT in ON state and a dashed arrow represents a direction in which a current flows in each period.

As illustrated in FIG. 2 and FIG. 3, during a first period in the timing sequence diagram, EM is at a valid level.

For the photosensitive sub-circuit, M1 is turned on and M2-M4 are turned off, such that the first storage capacitor C1 and M2 are grounded to be reset, so as to prepare for photosensitive operation in a next period.

For the display sub-circuit, T1 is turned on and T2, T3, T4, T5 and T6 are turned off, such that the point b is grounded to be restored to a voltage 0V, so as to restore a previous voltage signal.

As illustrated in FIG. 4 and FIG. 5, during a second period in the timing sequence diagram, the signal at the first scan line Scan[1] is valid.

For the photosensitive sub-circuit, M3 is turned on, the gate and the source of M2 are connected, and a coupled voltage $V_{data}$ is outputted, and the voltage difference stored in C1 is a constant value after a potential transform performed by M2 itself, wherein the voltage at the second terminal of C1 is a sum of the voltage on the data line and a sensed voltage of M2, and the voltage at the first terminal of C1 is the voltage on the data line, and thus the voltage difference of C1 is the sensed voltage. When there is a touch (light touch or finger touch) at this location, light illumination intensity received by M2 varies and thus a charging current varies so as to prepare for a period of reading a current signal, wherein the light illumination intensity increases and the charging current increases if the touch is the light touch, for example, a laser touch, otherwise the light illumination intensity decreases and the charging current decreases if the touch is the finger touch which is equivalent to shading light.

For the display sub-circuit, it is a charging period, T2 and T3 are turned on and T1, T4, T5 and T6 are turned off, such that the point a is charged by the signal $V_{data}$ through T2→DTFT→T3 until the point a is charged to $V_{data}$-$V_{th}$ (which satisfies that the voltage difference between the gate and the source of the DTFT is $V_{th}$). During this period, since the point b is connected to ground and is always 0, the voltage at the point a is maintained at $V_{data}$-$V_{th}$ after the charging is completed. In addition, the current does not flow through OLED since T5 is in an OFF state, such that the loss of the OLED can be reduced indirectly.

Figure 7:
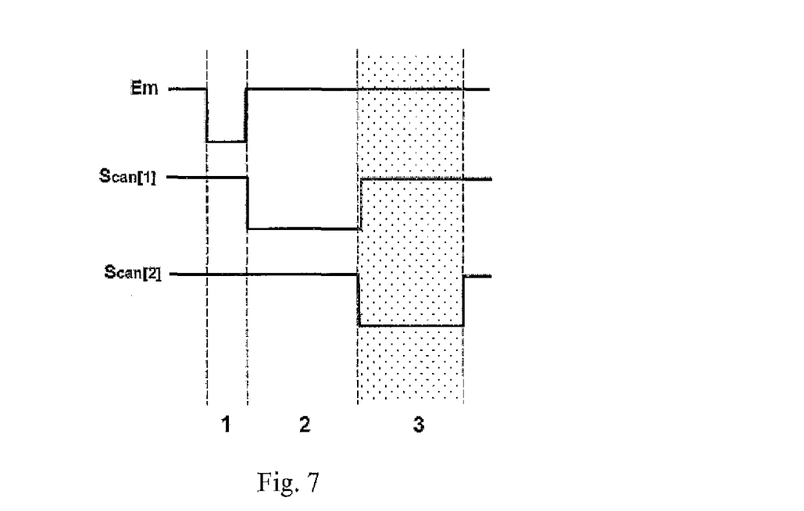
FIG. 7 is a schematic diagram illustrating a timing sequence of the pixel driving circuit in FIG. 1 during the compensating period and the light-emitting period, which corresponding to a third period.

As illustrated in FIGS. 6 and 7, during a third period in the timing sequence diagram, the signal on the second scan line Scan[2] is valid.

For the photosensitive sub-circuit, it is a signal reading period, M1 and M3 are turned off and M4 is turned on, at this time, a current path is formed as C1→M4→Y. Read Line, a current signal is transmitted to an amplifier at the end of the signal detecting line Y Read Line via the signal detecting line Y. Read Line, and an amplified signal is provided to a processor which performs data calculation and analysis. When a touch action occurs during this period, a difference between a current intensity before the touch action and that after the touch action is compared to a predefined no-touch threshold (the current will increase for the light touch and will decrease for the finger touch), such that it can be determined whether there is a touch. At this regard, a coordinate in X direction is determined by Scan[2] and a coordinate in Y direction is determined by Y. Read Line.

For the display sub-circuit, it is a normal light emitting period of an OLED pixel, T4, T5 and T6 are turned on and T2, T3 and T1 are turned off at this time. At this time, the voltage at the point b is changed from the previous 0V to $V_{data}$ and the point a is in a floating state, the voltage at the point a, i.e., the gate of the DTFT will transit to $2V_{data}$-$V_{th}$ since the previous voltage difference $V_{data}$-$V_{th}$ between the points a and b should be maintained. At this time, the source of the driving transistor DTFT is connected to the power supply line and is supplied with the voltage $V_{dd}$ of the power supply line S, and a current flowing through T4→DTFT→T5 enables the light emitting element D to emit light.

From the equation for a saturation current of a driving transistor DTFT, it can be obtained that $$I_{OLED} = K(V_{OS} - V_{th})^2 = K[V_{dd} - (2V_{data} - V_{th})]^2 = K(V_{dd} - 2V_{data})^2$$

$$K = \mu \cdot C_{ox} \frac{W}{L}$$

where $V_{GS}$ represents a gate-source voltage of the DTFT, $\mu$ represents the carrier mobility, $C_{ox}$ represents the capacitance of the oxide layer of the gate, W/L represents the width/length ratio of the driving transistor DTFT.

From the above equation, it can be seen that the operational current $I_D$ is independent of $V_{th}$ and only has a relationship with $V_{data}$. Therefore, the issue of threshold voltage ($V_{th}$) drift due to manufacturing process and long term operation of the driving transistors DTFTs is thoroughly addressed, the effect of the threshold voltage ($V_{th}$) drift on $I_{OLED}$ is also removed, and thus the normal operation of OLED is ensured.

In an embodiment of the present disclosure, there is further provided an array substrate comprising the above-described pixel driving circuit.

In an embodiment of the present disclosure, there is further provided a display device comprising the above array substrate. The display device may be any product or components having display function such as AMOLED panel, television, digital photo frame, mobile phone, tablet and so on.

It should be understood that the above descriptions are only for illustrating the embodiments of the present disclosure, and in no way limit the scope of the present disclosure. Those skilled in the art may make variations or alternatives to the above embodiments without departing from the spirit and scope of the present disclosure, and thus all equivalent technical solutions should fall in the scope of the present disclosure which should be define by the attached claims.

The present application claims the priority of a Chinese application with an application No.201410189757.X and filed on May 6, 2014, the disclosure of which is entirely incorporated herein as a part of the present disclosure by reference.

What is claimed is:

1. A pixel driving circuit comprising: a data line, a first scan line, a second scan line, an enable control line, a power supply line, a light emitting element, a display sub-circuit and a photosensitive sub-circuit; wherein the display sub-circuit is connected to the data line, the first scan line, the second scan line, the enable control line, the power supply line and the light emitting element, and is configured to drive the light emitting element to emit light for display under control of the first scan line, the second scan line, the enable control line, the data line and the power supply line; and the photosensitive sub-circuit is connected to the data line, the first scan line, the second scan line and the enable control line, and is configured to sense a touch action under the control of the first scan line, the second scan line, the enable control line and the data line;

wherein the photosensitive sub-circuit comprises: a first storage capacitor and a signal sensing unit;

wherein the signal sensing unit is connected to the data line, the first scan line and the first storage capacitor, and is configured to write a signal on the data line and a sensed photosensitive signal into the first storage capacitor under the control of the first scan line.

2. The pixel driving circuit of claim 1, wherein the photosensitive sub-circuit comprises: a signal detecting line, a reset unit and a signal reading unit; wherein the reset unit is connected to the enable control line and a first terminal of the first storage capacitor, and is configured to reset a level at the first terminal of the first storage capacitor under the control of the enable control line; and the signal reading unit is connected to a second terminal of the first storage capacitor, the second scan line and the signal detecting line, and is configured to read out a signal stored in the first storage capacitor and transmit the same to the signal detecting line under the control of the second scan line.

3. The pixel driving circuit of claim 2, wherein the reset unit comprises a seventh transistor having a gate connected to the enable control line, a source connected to a first terminal of the first storage capacitor and a drain connected to ground, wherein the seventh transistor is configured to connect the first terminal of the first storage capacitor to ground under the control of the enable control line.

4. The pixel driving circuit of claim 2, wherein the signal sensing unit comprises an eighth transistor and a photosensitive transistor, wherein the eighth transistor has a gate connected to the first scan line, a source connected to the data line and a drain connected to a source of the photosensitive transistor and the first terminal of the first storage capacitor, and is configured to write the signal on the data line into the first terminal of the first storage capacitor under the control of the first scan line; and the photosensitive transistor has a gate connected to a source thereof and a drain connected to the second terminal of the first storage capacitor, and is configured to sense the photosensitive signal and write the same into the second terminal of the first storage capacitor.

5. The pixel driving circuit of claim 2, wherein the signal reading unit comprises a ninth transistor having a gate connected to the second scan line, a source connected to the second terminal of the first storage capacitor, and a drain connected to the signal detecting line, wherein the ninth transistor is configured to read out the signal stored in the first storage capacitor and transmit the same to the signal detecting line under the control of the second scan line.

6. The pixel driving circuit of claim 1, wherein the display sub-circuit comprises a second storage capacitor, a restore unit, a data writing unit, a light emitting control unit, and a driving transistor, the restore unit is connected to the enable control line and a first terminal of the second storage capacitor, and is configured to restore a voltage at the first terminal of the second storage capacitor to a low level under the control of the enable control line;

the data writing unit is connected to a second terminal of the second storage capacitor, the first scan line, the data line and the driving transistor, and is configured to write information comprising a threshold voltage of the driving transistor and the voltage on the data line into the second terminal of the second storage capacitor under the control of the first scan line;

the light emitting control unit is connected to the second scan line, the data line, the power supply line, the first terminal of the second storage capacitor, the driving transistor and the light emitting element, wherein the driving transistor has a gate connected to the second terminal of the second storage capacitor and a source and a drain connected to the light emitting control unit, and the light emitting control unit is configured to make the first terminal of the second storage capacitor be at the voltage on the data line under the control of the second scan line, maintain the voltage difference across the two terminals of the second storage capacitor, and connect the driving transistor to the power supply line so as to drive the light emitting element to emit light.

7. The pixel driving circuit of claim 6, wherein the restore unit comprises a first transistor having a gate connected to the enable control line, a source connected to the first terminal of the second storage capacitor and a drain connected to ground, wherein the first transistor is configured to connect the first terminal of the second storage capacitor to ground under the control of the enable control line so as to restore the voltage at the first terminal of the second storage capacitor to the low level.

8. The pixel driving circuit of claim 6, wherein the data writing unit comprises a second transistor and a third transistor, wherein the second transistor has a gate connected to the first scan line, a source connected to the data line and a drain connected to the source of the driving transistor;

the third transistor has a gate connected to the first scan line, a source connected to the drain of the driving transistor, and a drain connected to the second terminal of the second storage capacitor;

the second transistor and the third transistor are configured to form a path under the control of the first scan line so as to write information comprising the threshold voltage of the driving transistor and the voltage on the data line into the second terminal of the second storage capacitor.

9. The pixel driving circuit of claim 6, wherein the light emitting control unit comprises: a fourth transistor, a fifth transistor and a sixth transistor, wherein the fourth transistor has a gate connected to the second scan line, a source connected to the power supply line, and a drain connected to the source of the driving transistor;

the fifth transistor has a gate connected to the second scan line, a source connected to the drain of the driving transistor, and a drain connected to the light emitting element;

the sixth transistor has a gate connected to the second scan line, a source connected to the data line, and a drain connected to the first terminal of the second storage capacitor, and is configured to write the voltage on the data line into the first terminal of the second storage capacitor under the control of the second scan line and maintain the voltage difference across the two terminals of the second storage capacitor;

the fourth transistor and the fifth transistor are configured to form a path under the control of the second scan line so as to connect the driving transistor to the power supply line to drive the light emitting element to emit light.

10. The pixel driving circuit of claim 6, wherein the light emitting element is an organic light emitting diode having an anode connected to the light emitting control unit and a cathode connected to ground.

11. A driving method for the pixel driving circuit of claim 1, comprising: driving the light emitting element to emit light for display by the display sub-circuit under the control of the first scan line, the second scan line, the enable control line, the data line and the power supply line; and sensing a touch action by the photosensitive sub-circuit under the control of the first scan line, the second scan line, the enable control line and the data line.

12. The driving method of claim 11, wherein the sensing the touch action by the photosensitive sub-circuit under the control of the first scan line, the second scan line, the enable control line and the data line comprises:

applying an enable signal to the enable control line such that the reset unit resets a level at the first terminal of the first storage capacitor;

applying a first scan valid signal to the first scan line, such that the signal sensing unit writes a signal on the data line and a sensed photosensitive signal into the first storage capacitor; and applying a second scan valid signal to the second scan line, such that the signal reading unit reads out a signal stored in the first storage capacitor and transmits the same to the signal detecting line.

13. The driving method of claim 12, wherein the applying the first scan valid signal to the first scan line such that the signal sensing unit writes the signal on the data line and the sensed photosensitive signal into the first storage capacitor comprises:

applying the first scan valid signal to the first scan line such that the eighth transistor is turned on so as to write the signal on the data line into the first terminal of the first storage capacitor, and the photosensitive transistor is turned on so as to sense the photosensitive signal and write the same into the second terminal of the first storage capacitor.

14. The driving method of claim 12, wherein the applying the second scan valid signal to the second scan line such that the signal reading unit reads out a signal stored in the first storage capacitor and transmits the same to the signal detecting line comprises:

applying the second scan valid signal to the second scan line such that the ninth transistor is turned on so as to read out the signal stored in the first storage capacitor and transmit the same to the signal detecting line.

15. The driving method of claim 12, wherein applying the enable signal to the enable control line such that the reset unit resets the level at the first terminal of the first storage capacitor comprises:

applying the enable signal to the enable control line, such that the seventh transistor is turned on so as to connect the first terminal of the first storage capacitor to ground.

16. The driving method of claim 11, wherein the driving the light emitting element to emit light for display by the display sub-circuit under the control of the first scan line, the second scan line, the enable control line, the data line and the power supply line comprises:

applying an enable signal to the enable control line such that the restore unit restores a voltage at the first terminal of the second storage capacitor to a low level;

applying the first scan valid signal to the first scan line, such that the data writing unit writes information comprising the threshold voltage of the driving transistor and the voltage on the data line into the second terminal of the second storage capacitor; and applying the second scan valid signal to the second scan line, such that the light emitting control unit writes the voltage on the data line into the first terminal of the second storage capacitor, maintains the voltage difference across the two terminals of the second storage capacitor, and connects the driving transistor to the power supply line so as to drive the light emitting element to emit light.

17. The driving method of claim 16, wherein the applying the first scan valid signal to the first scan line such that the data writing unit writes information comprising the threshold voltage of the driving transistor and the voltage on the data line into the second terminal of the second storage capacitor comprises:

applying a first scan valid signal to the first scan line, such that the second transistor and the third transistor are turned on so as to form a path so as to write information comprising the threshold voltage of the driving transistor and the voltage on the data line into the second terminal of the second storage capacitor.

18. The driving method of claim 16, wherein the applying the second scan valid signal to the second scan line such that the light emitting control unit writes the voltage on the data line into the first terminal of the second storage capacitor, maintains the voltage difference across the two terminals of the second storage capacitor, and connects the driving transistor to the power supply line so as to drive the light emitting element to emit light comprises:

applying the second scan valid signal to the second scan line, such that the sixth transistor is turned on so as to write the voltage on the data line into the first terminal of the second storage capacitor , maintain the voltage difference across the two terminals of the second storage capacitor, and the fourth transistor and the fifth transistor are turned on so as to form a path so as to connect the driving transistor to the power supply line to drive the light emitting element to emit light.

19. The driving method of claim 16, wherein applying the enable signal to the enable control line such that the restore unit restores the voltage at the first terminal of the second storage capacitor to the low level comprises:

Applying an enable signal to the enable control line, such that the first transistor is turned on so as to connect the first terminal of the second storage capacitor to ground.

20. An array substrate comprising the pixel driving circuit of claim 1.

* * * * *